United States Patent
Udwin et al.

[19]

[11] Patent Number: 6,106,015
[45] Date of Patent: Aug. 22, 2000

[54] BINDER AND METHOD OF FABRICATING SAME

[75] Inventors: Steven C. Udwin, Tenafly; Marshall L. Weingarden, Haworth; David Tarica, Tenafly, all of N.J.

[73] Assignee: Enor Corporation, Northvale, N.J.

[21] Appl. No.: 09/244,357

[22] Filed: Feb. 4, 1999

[51] Int. Cl.$^7$ ...................................................... B42D 3/00
[52] U.S. Cl. ........................... 281/29; 281/21.1; 281/31; 281/36; 281/37; 281/38; 402/70; 402/73; 402/79; 206/308.1; 206/308.3; 206/311; 206/312; 156/73.1
[58] Field of Search .............................. 281/29, 21.1, 31, 281/36, 37, 38; 402/70, 73, 79; 206/308.1, 311, 312, 308.3; 156/73.1

[56] References Cited

U.S. PATENT DOCUMENTS

| | | | |
|---|---|---|---|
| 4,892,333 | 1/1990 | Krulich | 281/15.1 |
| 5,466,008 | 11/1995 | Ozeki | 281/31 |
| 5,711,627 | 1/1998 | Chapman | 402/3 |
| 5,975,578 | 11/1999 | Mayer | 281/37 |

*Primary Examiner*—Willmon Fridie, Jr.
*Assistant Examiner*—Daniel Phan
*Attorney, Agent, or Firm*—Weingram & Associates, P.C.

[57] ABSTRACT

A binder for storing collectibles in holder pages of a material dissimilar to the binder cover. The sheets of pages are fastened to each other and to the binder cover by ultrasonically sealing the sheets directly or indirectly through the internal surface of the cover to a concealed anchoring rib of the same material as the holder pages, which anchoring rib is disposed and secured in the spine of the cover. A method of manufacturing a binder for storing collectibles is also disclosed in which a series of sheets of pages is superimposed over the internal surface of the binder cover and then the sheets are fastened by ultrasonically sealing them to the cover by means of ultrasonic sealing tools which pierce and fuse the sheets along the desired line of attachment to form a single booklet, and then continue directly or indirectly through the internal surface of the cover to contact a concealed anchoring rib of the same material disposed in the spine of the binder.

67 Claims, 8 Drawing Sheets

BINDER AND METHOD OF FABRICATING SAME

BACKGROUND OF THE INVENTION

1. Field of the Invention

The present invention relates to binders and in particular to binders used for holding archival materials such as stamp collections, photographs and other items to be preserved, including recording medium, such as CDs. The binders may be used as storage wallets, both zippered and unzippered, for holding compact discs and CD-ROMs. The invention also relates to a method of manufacturing binders and storage wallets. More particularly, this invention relates to a method of manufacturing binders and storage wallets of dissimilar, and typically incompatible, plastic or other material.

2. Description of the Prior Art

Traditionally, binders for holding archival material or storage wallets for holding compact discs and CD-ROMs are made of vinyl, typically polyvinyl chloride (PVC), or cloth. A popular style binder or wallet has pockets or flaps formed on the inside surface of the front and back vinyl covers of the binder or wallet. A set of pages with pockets for storing items is welded to a rigid plastic pseudo-cover to form a booklet. The pseudo-cover is then inserted or slid into the pockets or flaps on the inside of the binder cover to hold the booklet in place.

This style of binder requires fabricating an entire coverless album, wherein all the storage pages are welded together at the spine to form a booklet. Rigid pseudo-covers or panels are adhered to the booklet by welding, gluing, heat sealing, riveting or other means of physically fastening the pseudo-cover to the booklet. The pseudo-covers or panels are then manually inserted or slid into the pockets formed on the inside surface of the front and back covers of the binder.

The disadvantages of this style of binder include the large amount and variety of materials needed, the labor intensive assembly step of inserting the booklet into the pockets of the cover, the high stress on the pocket formed in the covers, and the bulkiness of the binder. Typically, as the booklet is not permanently secured in the cover pockets, the booklet may easily be removed from or can fall from the binder or wallet during handling.

Quality and expense are also concerns in the manufacture of binders. Polypropylene pages are preferred for archival purposes. Whereas vinyl pages stick to CDs or other stored materials, and can react with ink, polypropylene pages are archival and will not stick to discs, react with ink, cold crack, or ripple or yellow with age.

While polypropylene pages are preferred in albums, vinyl covers are desirable as they can be textured to resemble leather and are easy to decorate and imprint. The problem is that polypropylene pages cannot be fastened or welded to a vinyl cover, as these materials are dissimilar. Typically, polypropylene pages are heat sealed to rigid polypropylene pseudo-covers in a manner similar to the way commonly used vinyl pages are attached to rigid vinyl covers.

Attempts have been made to deal with these problems, as shown in prior U.S. patents.

U.S. Pat. No. 3,555,713 to Leinbach discloses a microfiche folder for use in a loose-leaf ring binder comprising sheets of flexible, transparent material joined together to form a page having a plurality of pockets for holding microfiche, index cards, etc.

U.S. Pat. No. 4,244,762 to Holson discloses a method of forming a photographic album page having double sided pockets formed by ultrasonic sealing of overlying clear laminae together through the centrally disposed fibrous lamina which disintegrates under the heat of sealing. A non-continuous electronic stitch is used to avoid completely severing the fibrous lamina at the lines of stitching.

U.S. Pat. No. 4,263,357 to Holson discloses a photographic album page having double sided pockets formed by ultrasonic sealing of overlying clear laminae together through the centrally disposed fibrous lamina which disintegrates under the heat of sealing.

U.S. Pat. No. 5,396,987 to Temple discloses a container for CDs formed of three layers of polypropylene heat sealed together in a line-type heat seal pattern. The middle layer comprises a soft, opaque, spun-bonded polypropylene laminated to a 4 millimeter thick polypropylene backing member. One pocket holds a CD; another top, thin pocket holds a CD title bar. A third pocket formed between the second layer and back layer hold a CD package inset, or card.

U.S. Pat. No. 4,850,731 to Youngs discloses a plastic storage sleeve for CDs comprising a plastic cover having a pocket for a CD and another pocket for an information insert. The storage sleeve is used to store discs singly or in multiples. Graphics are stored in contact with the backing sheet which is joined by heat lamination to the nonwoven fabric. Flaps shield the surface of the CD from dust, scratches and lint.

U.S. Pat. No. 5,462,160 to Youngs discloses a storage container for storing a CD comprising a first flexible sheet; a nonwoven fabric sheet overlaying the first flexible sheet; a second flexible sheet overlaying the nonwoven fabric sheet and joined to the first flexible sheet to define a CD storage area, the second sheet having a cut to define a flap portion which hinges along a hinge line, the cut terminating at two ends and having arcuate regions adjacent to the ends to protect the flap portion from tearing.

U.S. Pat. No. 5,501,326 to Shuhsiang discloses a laser record protection folder comprising an outer cover with a loose-leaf fastener to hold several bag elements. One side of the bag element has two dividing lines and a slot to form two opening flaps to ease insertion of the record. A projected center flap prevents the record from slipping out.

U.S. Pat. No. 5,669,491 to Pettey discloses a compact disc folder in the form of a booklet held between two opposing panels of a cover portion. The pages of the booklet are attached to the cover portion by saddle stitching, stapling or gluing.

U.S. Pat. No. D304,781 to Hanson discloses a design for a compact disc holder comprising a cover for holding a booklet with pockets for storing CDs. The booklet has a backing which slides into flaps on the inside of the cover for holding the booklet in place.

U.S. Pat. No. D360,800 to Temple et al. discloses a design for a multi-leaf holder for compact discs, the pockets for storing CDs secured to the cover by a hinge-type screw binding.

U.S. Pat. No. D367,796 to Ozeki discloses a design for a recording medium storing case having a plurality of discs stored on one page. The pages are mechanically, releasably secured to the cover.

U.S. Pat. No. D379,896 to Friedman discloses a design for CD disk holder. It is unclear how the spine of the binder is constructed or how the CD is held in place.

Accordingly, there is a need for a binder having a vinyl cover with booklet pages of polypropylene.

OBJECTS AND SUMMARY OF THE INVENTION

The invention contemplates a binder for storing collectibles in holder pages. The sheets of pages are made of a material dissimilar to the external and internal surface of the binder cover. The sheets of pages are fastened to each other and to the binder cover by fastening or sealing the sheets directly or indirectly through the internal surface of the cover to a concealed anchoring rib of the same material as the sheets of pages, which anchoring rib is disposed and secured in the spine of the cover.

The present invention also sets forth a method of manufacturing a binder for storing collectibles in which a series of polypropylene sheets of pages is superimposed over the internal surface of the binder cover and then the sheets are fastened by ultrasonically sealing them to the cover by means of ultrasonic sealing tools which pierce and fuse the sheets along the desired line of attachment to form a single booklet, and then continue directly or indirectly through the internal surface of the cover to contact a concealed anchoring rib of the same material disposed in the spine of the binder.

It is an object of this invention to provide a compact binder of simple construction which enables permanent attachment of dissimilar materials, without external fastening means.

It is a further object of the invention to provide a binder in which polypropylene sheets of pages are attached to a vinyl cover.

It is a further object of the invention to provide a light weight binder which does not require extra pieces of construction to hold and piece together.

Another object of the invention is to provide a binder which is less expensive than styles currently in use and which is more attractive and durable.

Yet another object of the invention is to provide a binder which is easy to assemble and offers greater flexibility in manufacturing.

It is yet a further object of the invention to provide a binder having a simplified booklet construction which is easily manufactured and avoids the need for extra members for insertion into holding pockets.

Yet another object of the invention is to provide a less expensive binder which holds more sheets of pages for the same thickness and weight.

Another object of the invention is to provide a binder where the sheets cannot disconnect from the cover.

A further object of the invention is to provide a binder enabling greater extension of the pages without affecting the booklet integrity or attachment to the cover.

Yet another object of the invention is to provide a binder where the cover and pages can lie flat and be fully opened.

It is yet another object of the invention to provide a binder having greater flexibility in the size of the booklet pages relative to the size of the cover, where the pages and cover can be the same size.

Yet another object of the invention is to provide a binder having a cover with a spine with internal anchoring material to be fastened, preferably by ultrasonically sealing, to a booklet of similar material through passages formed, during the sealing process, in the internal surface material of the cover.

Another object of the invention is to provide a binder having more flexible binding allowing greater extension of pages when the binder is in the open position and full access to all pages without disturbing other pages or fear of detaching other pages from the binder cover.

Another object of the invention is to provide a method of manufacturing a binder by joining dissimilar materials so as to fasten polypropylene pages to a vinyl cover.

Yet another object of the invention is to provide a method of manufacturing a binder for collectibles which does not require pockets in the cover of the binder to hold a booklet of pages.

A further object of the invention is to provide a method of manufacturing a binder which does not require a separate, labor-intensive step in the assembly process of placing a rigid plastic pseudo-cover into retaining pockets in the inside cover of the binder.

Yet another object of the invention is to provide a method of manufacturing a binder which utilizes a cover spine comprising two or more materials in order to enable attachment of booklet sheets directly to and along the length of the cover at the spine.

Yet another object of the invention is to provide a method of manufacturing a binder by a simple manufacturing process requiring less manual assembly and less expense.

Another object of the invention is to provide a method of manufacturing a binder in which sheets having pockets are fastened to an anchoring rib in the spine of the binder, either directly or indirectly through the inner film blank lining the spine.

These and other objects and advantages will become readily apparent from the following detailed description of the invention and from the drawings.

BRIEF DESCRIPTION OF THE DRAWINGS

For a more complete understanding of the present invention, reference may be had to the following description of exemplary embodiments of the present invention considered in connection with the accompanying drawings, in which.

DETAILED DESCRIPTION OF THE INVENTION

The present invention advantageously disposes and conceals an anchoring rib in the spine of the binder. In this way it is possible to construct a vinyl binder having polypropylene storage pages. An ultrasonic seal passing from the polypropylene layer (i.e., the booklet of sheets of pages) directly or indirectly through a vinyl layer (i.e., the inside of the cover), or through to passages formed in the vinyl layer, binds the booklet of sheets of holder pages together and to a polypropylene layer (i.e., the anchoring rib concealed in the spine of the binder).

Thus, the invention contemplates replacing the rigid, plastic pseudo-cover of the prior art binder with an anchoring rib of plastic, preferably polypropylene, concealed between the inner and outer continuous film blanks lining the spine. A set of sheets of pages is fastened directly through one or more cutouts or openings in the inner film blank, or indirectly by piercing through the inner film blank, to attach the booklet to the anchoring rib concealed in the spine.

The use of the invention reduces the cost of the binder by replacing the rigid, plastic pseudo-cover with an anchoring rib disposed and concealed in the spine of the binder. This eliminates the need for rigid pseudo-covers and pockets inside the front and back covers of the binder. It also obviates the labor-intensive step of inserting the rigid pseudo-cover into the inside pockets of the binder cover. The binder of the invention is superior to prior art binders as the sheets of pages are affixed in one position and cannot shift or be displaced. The labor to fasten or seal the sheets to the concealed anchoring rib in the spine is about the same as the labor required to seal the sheets to the pseudo-cover in the prior art binders.

Referring to FIGS. 1A through 1D of the drawings, there is shown a representation of a prior art zippered binder 10 having a cover 11. The current method of assembling such a prior art binder 10 is to weld, heat seal or rivet a set of pages 12 having pockets 14 for storing items, such as a CD disc 16, to a rigid plastic pseudo-cover 18 having a front panel 20 and a back panel 22. The cover panels 20 and 22 are then inserted into pockets 24 and 26 in the inside cover 11 of the binder 10.

Figure 1A:
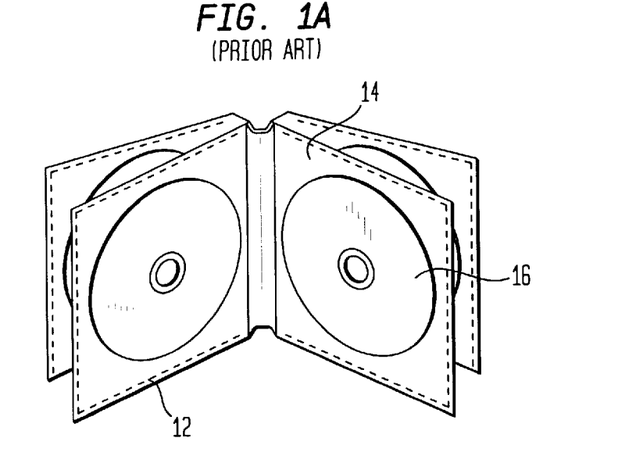
FIGS. 1A–1D shows the components and sequence of steps used in assembling a prior art binder or storage wallet.
Figure 1B:
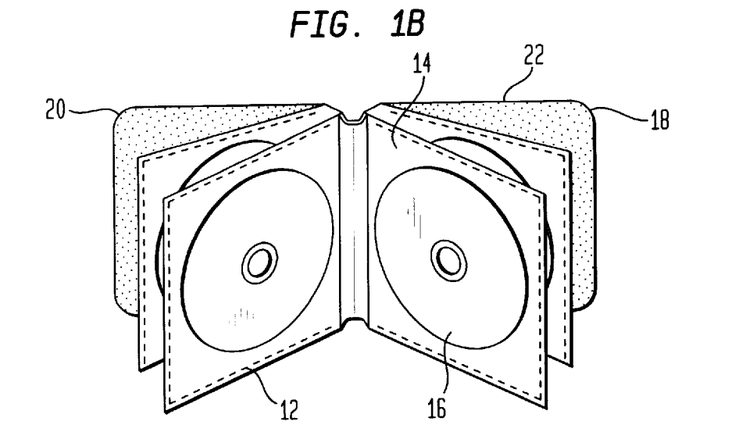
Figure 1C:
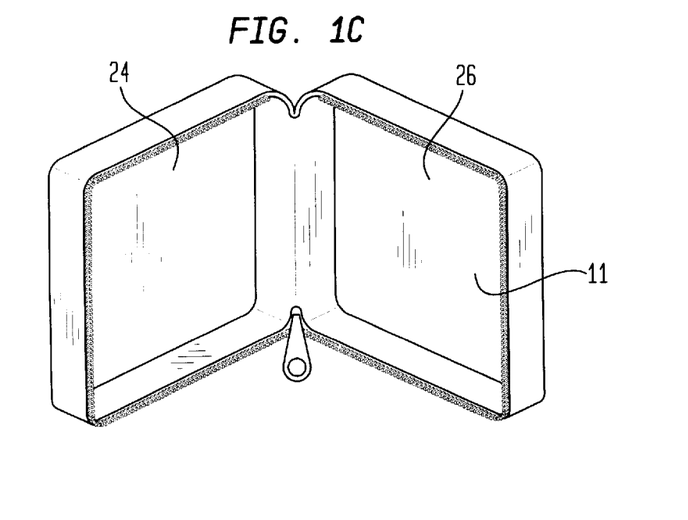
Figure 1D:
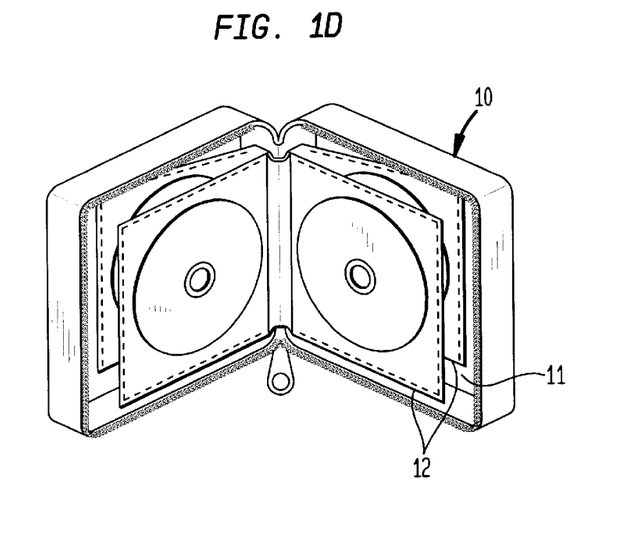
Figure 2A:
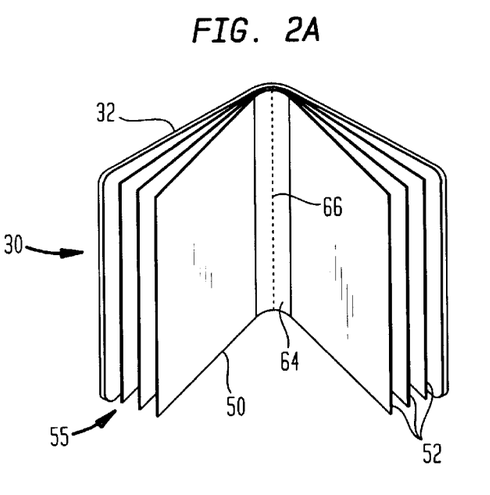
FIG. 2A shows an assembled binder according to a first embodiment of the invention.
Figure 2B:
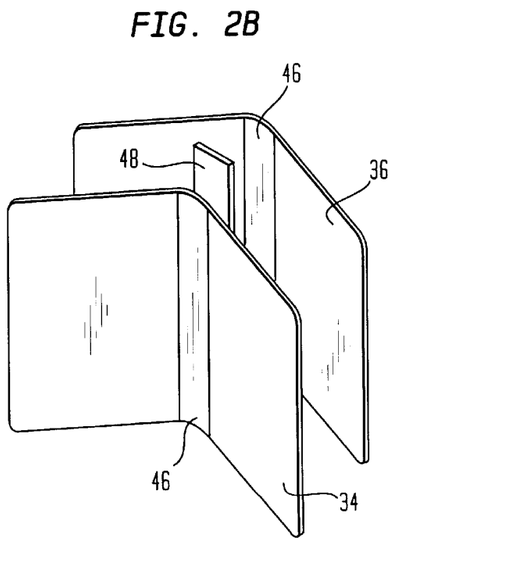
FIGS. 2B and 2C show the components used in assembling the binder of FIG. 2A in accordance with the teachings of the present invention.
Figure 2C:
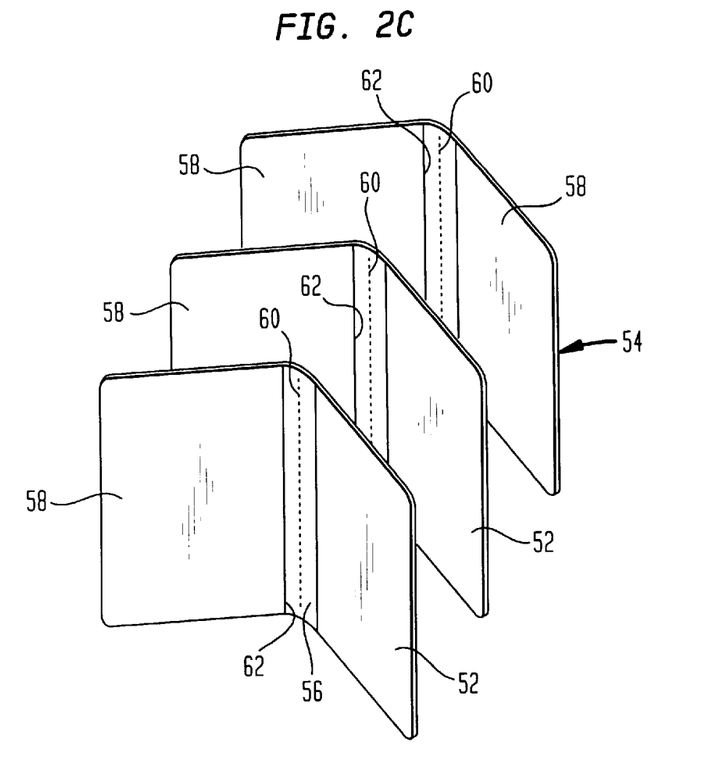
Figure 2D:
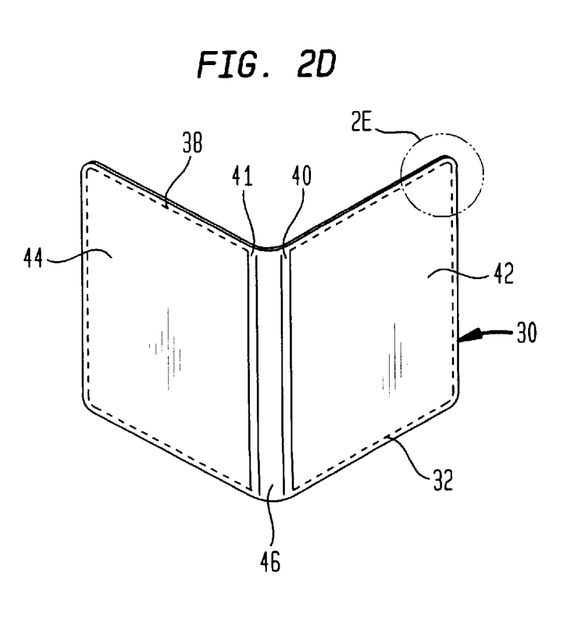
FIG. 2D shows the exterior of the binder of FIG. 2A of the invention.

Referring to FIG. 2A of the drawings, there is shown an assembled binder 30 of the invention and, referring to FIGS. 2B through 2D, there is shown the components of the binder 30 and a method of assembling a binder 30 for storing collectibles in holder pages. The binder 30 has a cover 32 made from an inner continuous film blank 34 superimposed over an outer continuous film blank 36.

The binder cover 32 comprising the inner continuous film blank 34 superimposed over the outer continuous film blank 36, may be made of vinyl, polyethylene, leather, cloth, paper or other material or combination of materials. By vinyl is meant any of various compounds containing the vinyl radical, used as a basic material for plastics, and is meant to include any of a group of polymerized thermoplastic vinyls, such as polyvinyl chloride. It is contemplated that the cover may be made of a rigid or flexible vinyl or polyethylene, or may be made of cardboard or cardboard covered with vinyl, paper, or leather. Being dissimilar, none of these materials are weldable to polypropylene or other ultrasonically sealable plastics, and hence polypropylene storage pages cannot be attached to binder covers of these materials.

Figure 2E:
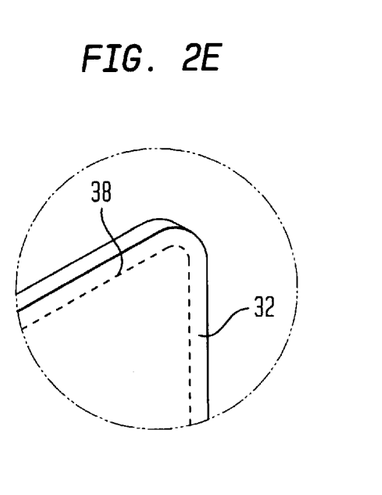
FIG. 2E is an enlarged view of a portion of the binder shown in FIG. 2D.

The inner and outer continuous film blanks 34, 36 are connected to each other, preferably at their peripheral edges or parameters, by any suitable means. This is typically done by radio frequency heat sealing in the case of vinyl covers, and by means of adhesive in the case of casebound or wrapped paper or cloth covers. Other connecting means may optionally include riveting, welding, ultrasonic sealing, stitching, etc. A view of the outside of the binder 30 is shown in FIG. 2D, and an enlarged view of a corner of the binder 30 is shown in FIG. 2E. A decorative stitch line 38 is visible around the peripheral edges of the binder 30.

Referring to FIG. 2D, a pair of foldlines 40, 41 formed by a any suitable means, including a pair of parallel heat sealed, or glued scores, connect the inner continuous film blank 34 to the outer continuous film blank 36. The foldlines 40, 41 delineate a front panel 42 of the cover 32, a rear panel 44 of the cover 32 and a spine 46 connecting the front panel 42 to the rear panel 44 of the cover 32. Specifically, a first foldline 40 interconnects the front panel 42 and the spine 46, and a second foldline 41 interconnects the rear panel 44 and the spine 46. The spine 46 joins the front and rear panels 42, 44 of the cover 32 together to allow relative movement of the front and rear panels 42, 44 between an opened and a closed state of the binder 30.

The foldlines 40, 41 allow for at least 180° rotation of the front and rear panels 42, 44 of the cover 32, to enable the binder 30 to lie flat and the pages to be fully opened, when the binder 30 is in the open position.

One or more layers of backing, stiffener and/or padding, not shown, may optionally be disposed between the inner and outer continuous film blanks 34, 36 of the cover 32 and spine 46. Alternatively, one or more of these additional layers may be disposed between the front and/or rear panels 42, 44 of the cover 32. An anchoring rib 48 disposed inside the spine 46 of the binder 30 may function as a stiffener of the spine.

An anchoring rib 48 is disposed and concealed inside the spine 46 of the binder 30 between the inner and outer continuous film blanks 34, 36 of the cover 32. Various means may be provided for positioning and securing the anchoring rib 48 inside the spine 46. The anchoring rib may be positioned and secured by means of passages formed in the inner film blank. Ultrasonic seals joining the sheets to the anchoring rib coact with the passages in the inner film blank to position and secure the anchoring rib in the spine. The passages are formed by ultrasonic sealing of the booklet to the anchoring rib through the inner film blank.

Alternatively, the means to position and secure the anchoring rib may include connecting means, such as, for instance, the parameter sealing of the inner and outer continuous film blanks, adhesive attachment, welding, heat sealing or stitching around the peripheral edges of the inner and outer film blanks 34, 36 to prevent up and down movement of the anchoring rib 48. The pair of parallel foldlines 40, 41 delineating the front and rear panels 42, 42 of the cover 32 may prevent lateral movement of the anchoring rib 48, while friction of the adjacent layers of material and the coaction of the inner and outer film blanks 34, 36 may hold the anchoring rib 48 in place in the spine 46.

Where the sheets of pages are polypropylene, the anchoring rib 48 is preferably comprised of polypropylene as well, and may be rigid or flexible. Where the sheets of pages are comprised of another ultrasonically sealable plastic, the anchoring rib is comprised of the same material. The anchoring rib is comprised of the same material as the pages so as to enable fastening of pages to a binder cover of a different material that is not compatible and thus, cannot be welded together.

The cover 32 encloses a booklet 50 comprising a plurality of pages 52, each pair of pages 52 formed from a sheet 54 of flexible material. The sheet 54 has a central portion 56 for alignment over the spine 46 of the binder 30 and peripheral portions 58 forming separate pages 52. The group of sheets 55 are folded around a common center line 60 to form a pair of pages 52. The pages may be of assorted styles, and some may have no pockets. Alternatively, the pages 52 may have means for holding collectibles, such as pockets 62. Pockets may be formed in any of a variety of known ways. The pocket may be attached on only two edges of the page. Alternatively, each sheet 54 may have at least one reverse sheet of substantially similar overall proportions overlying and joined thereto along three sides thereof to define at least one pocket 62 adapted for receiving and removably retaining collectibles therein. If comprised of a semi-rigid material, the pages may be folded on one edge. There may be no pockets, or at least one pocket 62 per page 52 which is formed by any suitable means, such as stitching, sealing, etc. It is possible to have pockets 62 on both sides of the booklet page 52 as well.

Where the booklet 50 is comprised of polypropylene or another ultrasonically sealable plastic, the booklet 50 is connected to the cover 32 which is comprised of a dissimilar material by a series of ultrasonic seals 64 forming a line of attachment 66. The ultrasonic seals 64 pierce the sheets 55 to attach or fuse the sheets 55 of the booklet 50 to each other from the topmost to the bottom-most sheet, along the common center line 60. Each of the ultrasonic seals 64 includes and disperses the material of each layer into the successive and adjacent material. The ultrasonic sealing line of attachment 66 preferably comprises a plurality of sealing points to avoid severing the items to be joined along the line of attachment.

The ultrasonic seals 64 pierce the sheets 55 and the inner continuous film blank 34 at the spine 46 of the binder 30 and extend to operatively engage the anchoring rib 48 to join the sheets 55 of the booklet 50 together from the top-most to the bottom-most sheet 54 and to join the booklet 50 to the anchoring rib 48 in the spine 46 of the binder 30, thus fastening the booklet to the cover.

Figure 9:
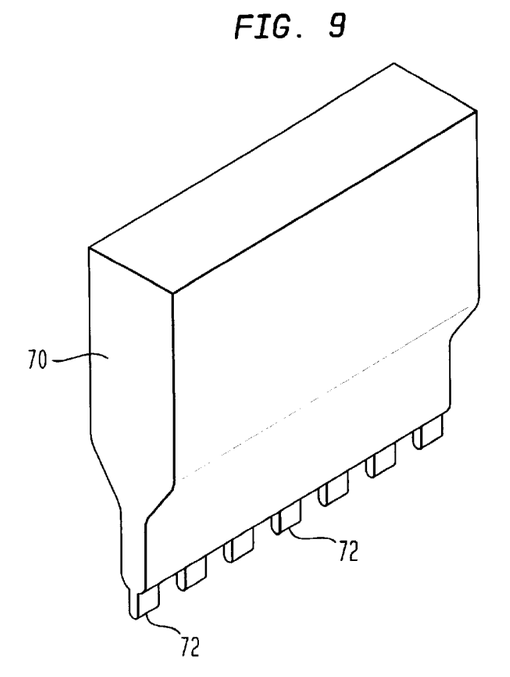
FIG. 9 shows a perspective view of an ultrasonic sealing tool.
Figure 10:
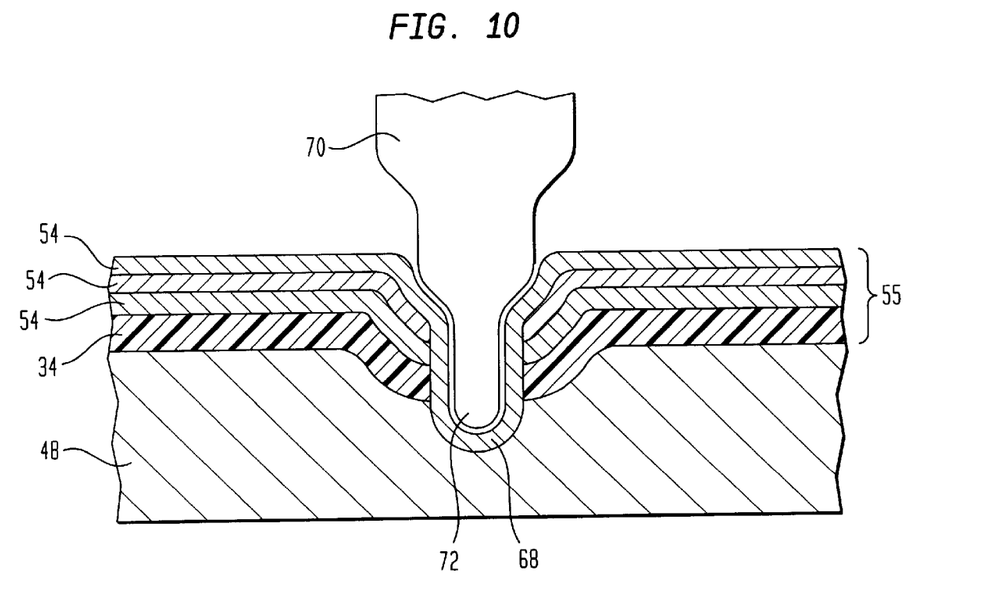
FIG. 10 is a cross-sectional view showing the action of the ultrasonic sealing tool fusing sheets of the booklet to the concealed anchoring rib in the spine of the binder.

Referring to FIG. 9, there is shown an ultrasonic sealing device 70 having welding tips 72. Referring to FIG. 10, the sheets 55 are fused together and the booklet 50 is joined through the inner continuous film blank 34 to the concealed anchoring rib 48 in the spine 46 by agitation of the welding tips 72 of the ultrasonic sealing device 70 along the desired line of attachment 66. The sheets 55 and the inner continuous film blank 34 are pierced by the ultrasonic sealing device 70 and the fragments 68 produced by the piercing are dispersed by ultrasonic agitation to enable bonding of the material of the booklet 50 to the compatible anchoring rib 48 material through the inner continuous film blank 34. The pierced material of each respective layer of the binder 30 forms fragments 68 which are sufficiently dispersed into the successive and adjacent material at the line of attachment formed by the ultrasonic seals 64 so as not to affect the joining compatibility of the booklet 50 material and the anchoring rib 48. As shown in FIG. 10, at the time and point at which fusing occurs, the components of the binder will assume substantially a U-shape, which represents the melt where all the elements are joined.

Thus, the sheets 55 of the booklet 50 are attached to each other along their common center line 60, and the booklet 50 is attached to the cover 32 at the common center line 60 by a series of ultrasonic seals 64 forming a line of attachment 66 along the common center line 60, the ultrasonic seals 64 joining the sheets 55 together and joining the sheets 55 to the anchoring rib 48 in the spine 46.

Figure 4:
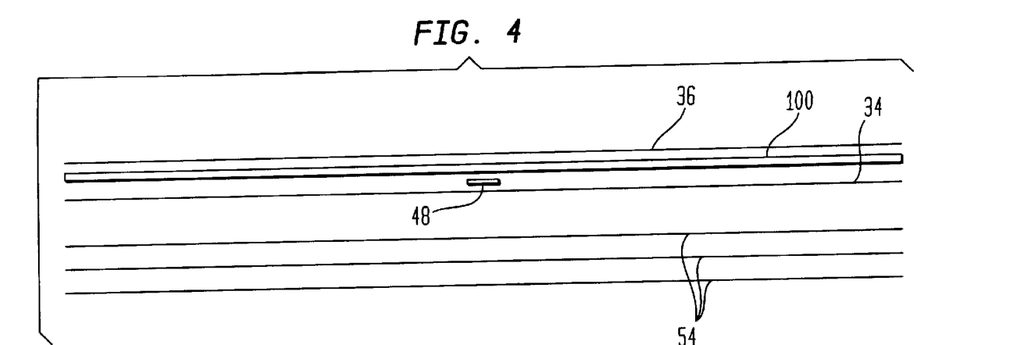
FIG. 4 shows an end view of the sheets and the elements which form the cover of a binder of the invention enlarged for purposes of clarity.

An end view of the sheets and the elements which form the cover of the binder, enlarged for purposes of clarity, is shown in FIG. 4. An intermediate layer 100, which may comprise one or more of a backing and/or a stiffener and/or a padding layer, may optionally be disposed between the inner and outer film blanks 34, 36 of the cover 32.

Figure 3A:
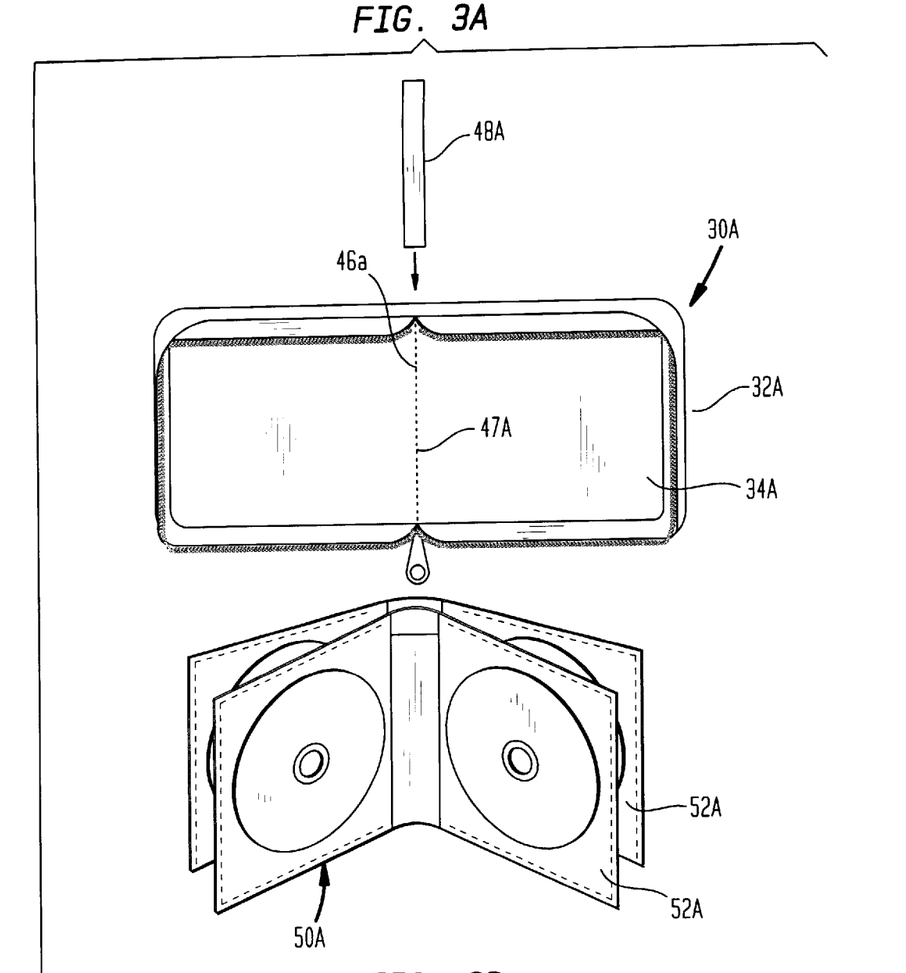
FIG. 3A shows the components of a second embodiment of a binder constructed in accordance with the teachings of the present invention.
Figure 3B:
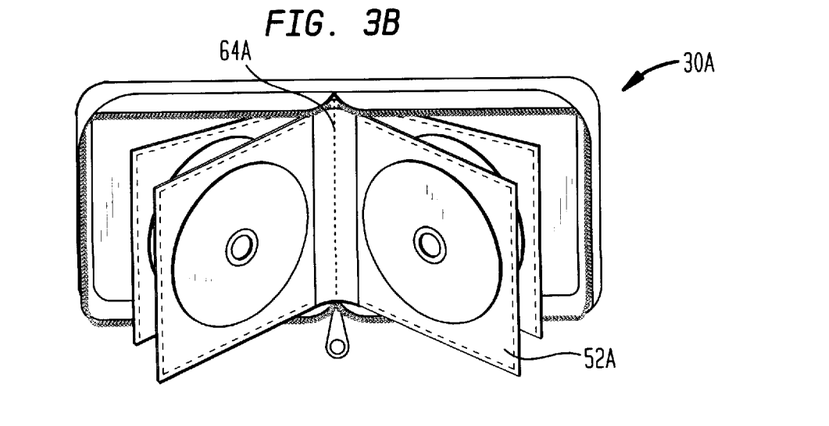
FIG. 3B shows the components of FIG. 3A in assembled form.

In a second embodiment of the invention, shown in FIGS. 3A and 3B, there is provided a zippered binder 30A for storing collectibles, such as CDs, in pocketed storage pages 52A. An anchoring rib 48A is disposed and concealed inside the spine 46A of the binder 30A between the inner continuous film blank 34A and the outer continuous film blank (not shown) of the cover 32A, and secured by fastening means 47A, such as friction, sealing, stitching, gluing, and other means of fastening. No foldlines are provided in this embodiment. The assembled binder is shown in FIG. 3B. The booklet 50A of sheets of pages 52A are fused together and joined through the inner continuous film blank 34A to the concealed anchoring rib 48A in the spine 46A by a series of ultrasonic seals 64A by agitation of the welding tips 72 of the ultrasonic sealing device 70 along the desired line of attachment, as described above for the embodiment of FIGS. 2A through 2D.

Figure 5:
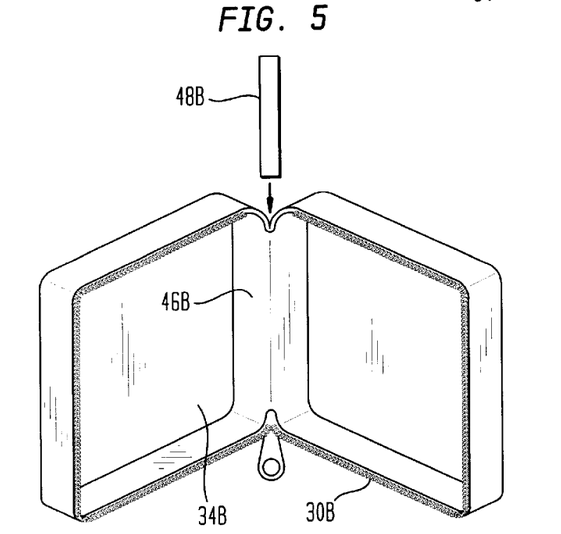
FIG. 5 shows the cover and anchoring rib of a third embodiment of the binder of the invention.
Figure 6:
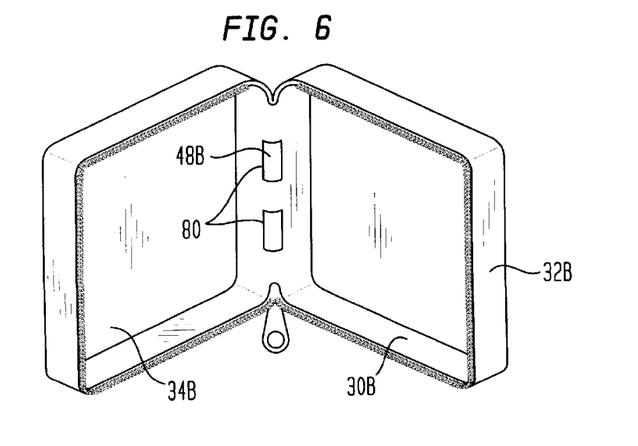
FIG. 6 shows the cover and the partially exposed anchoring rib in the spine of the cover of the third embodiment of the binder of the invention.

In a third embodiment of the invention, shown in FIGS. 5 and 6, the inner film blank 34B overlying the spine 46B includes at least one opening or cutout 80 exposing at least a portion of the concealed anchoring rib 48B. This allows access to the anchoring rib 48B through the exposed portion of the inner film blank 34B.

This third embodiment is particularly advantageous where the inner film blank 34B lining the spine 46B of the binder 30B comprises multiple layers of the same or differing materials. For instance, the cover 32B and spine 46B may be lined with expanded vinyl with a cloth backing, which is a desirable "look" in binders 30B. In such a binder, it is desirable to achieve a stronger, more secure seal through the inner film blank 34B at the spine 46B to bind the booklet 50B to the anchoring rib 48B and thus to the binder cover 32B. A stronger attachment of the booklet 50 to the cover 32B is achieved by cutting one or more openings 80 in the inner film blank 34B lining the spine 46B to expose one or more portions of the concealed anchoring rib 48B. This provides direct access to the anchoring rib 48B and permits ultrasonic sealing of the sheets 55B of the booklet 50B directly to the anchoring rib 48B at the exposed portions. Thus, the anchoring rib may be concealed or partially concealed in the spine.

Figure 7:
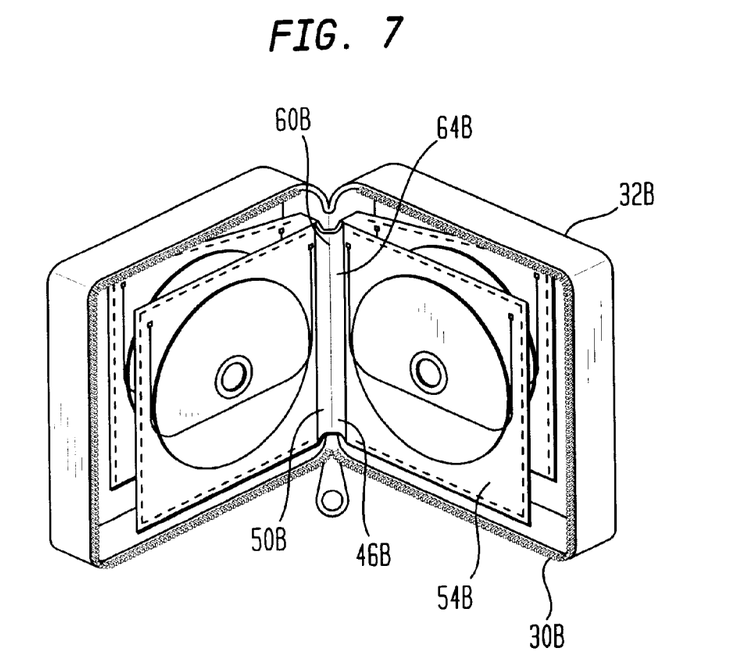
FIG. 7 shows the assembled binder of the third embodiment of the invention having a continuous ultrasonic sealing line of attachment to the concealed anchoring rib.

As shown in FIG. 7, it is possible to ultrasonically seal down the entire length of the booklet 50B, resulting in seals both where the anchoring rib 48B is concealed under the inner film blank and any other additional layers of material, and also where the anchoring rib is exposed and accessible. Alternatively, as shown in FIG. 8, the ultrasonic sealing operation may be performed only at the exposed portion(s) of the anchoring rib 48B so as to directly bond the booklet 50B to the anchoring rib 48B.

Figure 8:
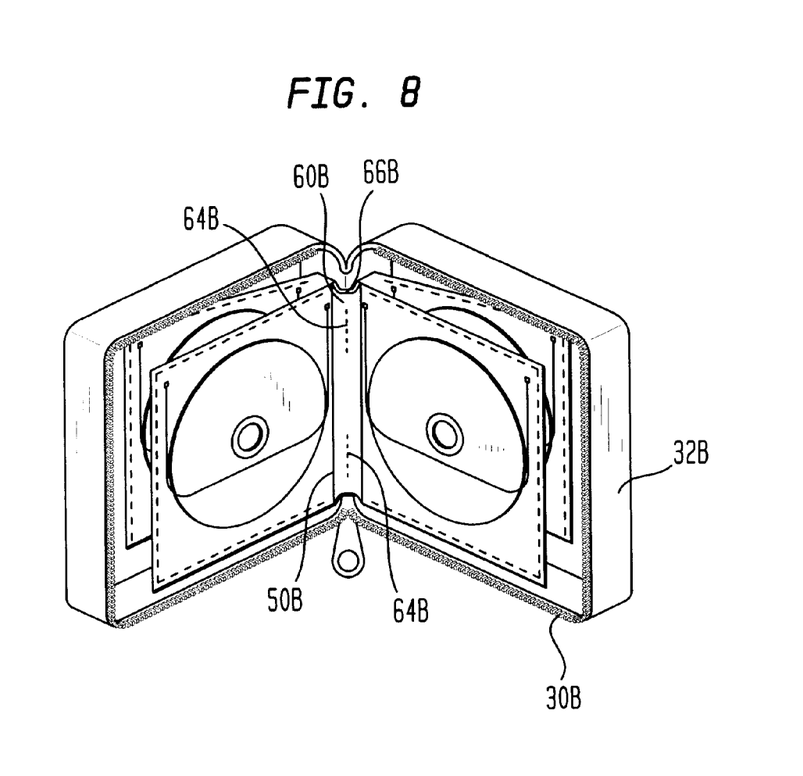
FIG. 8 shows the assembled binder of the second embodiment of the invention having a partial ultrasonic sealing line of attachment.

In the embodiment shown in FIGS. 7 and 8, the sheets 55B of the booklet 50B are attached to each other along at least a portion of the common center line 60B, and the booklet 50B is attached to the cover 32B along at least a portion of the center line 60B, by a series of ultrasonic seals 64B forming a line of attachment 66B along at least a portion of the center line 60B. The ultrasonic seals 64B join the sheets 55B together and directly join the sheets 55B to the anchoring rib 48B in the spine 46B at the exposed portions of the inner film blank 34B and anchoring rib 48B, and indirectly to the concealed anchoring rib through the inner film blank.

The sheets 55B are fused together and the booklet 50B is joined to the cover 32B through the cutout portion or portions of the inner film blank 34B to the exposed portion or portions of the anchoring rib 48B by agitation of the ultrasonic sealing along the desired line of attachment.

The pages 52 of the booklet 50 are comprised of a generally planar and typically flexible plastic film material which is ultrasonically sealable, preferably polypropylene. The pages may or may not be transparent. The pages may be opaque or decorated panels or pockets that have a clear front and opaque back or center panel, or the pages may be completely opaque. Where polypropylene pages are used, the anchoring rib 48 is also comprised of polypropylene. The cover 32 of the binder 30 is generally opaque and planar, and is produced from a material selected from the group consisting of vinyl, polyethylene, leather, paper, and cloth. Alternatively, the cover 32 of the binder 30 may be produced from a composite material comprising one or more layers of the same or differing materials selected from the group consisting of vinyl, polyethylene, leather, paper, and cloth. The cover may be flexible or rigid, rigid being preferred.

Figure 11:
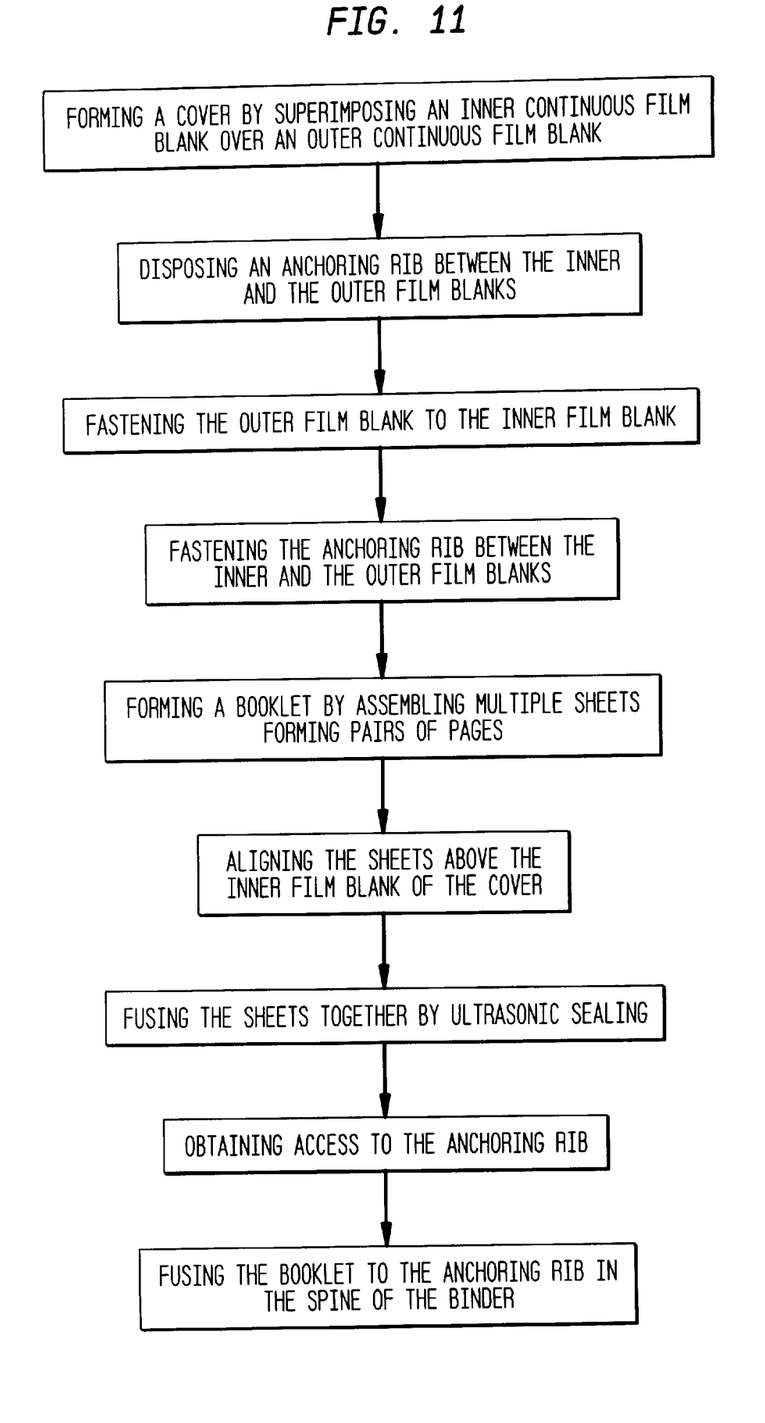
FIG. 11 is a schematic representation of the steps required to fabricate the binder of the invention.

The invention also contemplates a method of manufacturing a binder 30 for storing collectibles, the binder 30 having a cover 32 of one material enclosing a booklet 50 of holding pages 52 of a second material. The cover 32 is typically vinyl whereas the holding pages 52 are preferably polypropylene.

The method comprises the steps of forming a cover 32 by superimposing an inner continuous film blank 34 over an outer continuous film blank 36. An anchoring rib 48 is then disposed at a location between the inner and outer film blanks 34, 36. The inner and outer film blanks 34, 36 are then fastened together, preferably along their peripheral edges.

Optionally, a pair of generally parallel foldlines 40, 41 may be formed by any suitable means such as heat sealing, glued scores, stitching, ultrasonic sealing, or other means of fastening the inner to the outer film blank along the length of the anchoring rib 48. The foldlines 40 delineate a front panel 42 of the cover 32, a rear panel 44 of the cover 32, and a spine 46 interconnecting the front and rear panels 42, 44. The cover 32 may then be stitched for decorative purposes or for reinforcement.

A booklet 50 is formed by assembling multiple sheets 55 of flexible material folded around a common center line to form pairs of pages 52. The sheets 55 are aligned in relationship above the inner film blank of the cover 32.

The sheets 55 of the booklet 50 are attached to each other along their common center line, and the booklet 50 is attached to the anchoring rib 48 concealed in the spine 46 of the cover 32 along the center line, by ultrasonically sealing the booklet 50 to the anchoring rib 48 in the spine 46 to form a line of attachment. The ultrasonic seals pierce the sheets 55 and the inner continuous film blank 34 and extend to operatively engage the anchoring rib 48 to fuse the sheets 55 of the booklet 50 together from the topmost to the bottom-most sheet 54 and to join the booklet 50 to the anchoring rib 48 in the spine 46 of the binder 30. Each of the ultrasonic seals includes and disperses the material of each layer into the successive and adjacent material of the next layer.

The sheets 55 and the inner continuous film blank 34 are pierced by the ultrasonic sealing device and the fragments produced by the piercing are dispersed by ultrasonic agitation to enable bonding of the material of the booklet 50 to the compatible anchoring rib 48 material through the inner continuous film blank 34.

In a second embodiment of the method of the invention, it is contemplated to obtain access to the anchoring rib 48 through the inner film blank, so as to attach the sheets 55 of the booklet 50 to each other along at least a portion of the common center line, and to attach the booklet 50 directly to the anchoring rib 48 in the spine 46 of the cover 32 along at least a portion of the center line, by ultrasonically sealing the booklet 50 to the anchoring rib 48 in the spine 46 to form a line of attachment along at least a portion of the center line. The ultrasonic seals pierce the sheets 55 and may pierce portions of the inner continuous film blank 34 and extend to operatively engage the anchoring rib 48 through at least one opening or passage in the inner film blank to fuse the sheets 55 of the booklet 50 together from the topmost to the bottom-most sheet 54 and to join the booklet 50 directly to the anchoring rib 48 in the spine 46 of the binder 30 through the opening in the inner film blank.

Access to the anchoring rib 48 through the inner film blank is obtained by cutting at least one opening or passage in the inner film blank by any suitable means.

The invention is not limited to the precise details as shown and set forth in this specification, for obvious modifications will occur to those skilled in the art to which the invention pertains.

We claim:

1. A binder for storing collectibles in holder pages comprising:
 a cover having
  an outer continuous film blank;
  a backing material on said outer continuous film blank;
  an inner continuous film blank superimposed over said outer continuous film blank;
  a backing material on said inner continuous film blank;
  fastening means around the peripheral edges of said inner and outer continuous film blanks, said fastening means connecting said inner continuous film blank with said outer continuous film blank;
  a pair of parallel connecting means connecting said outer continuous film blank to said inner continuous film blank to form a pair of foldlines delineating a front panel of said cover, a rear panel of said cover and a spine connecting said front panel to said rear panel;
  said front panel of said cover having a layer of stiffener and a layer of padding disposed between said inner and said outer continuous film blanks;
  said rear panel of said cover having a layer of stiffener and a layer of padding disposed between said inner and said outer continuous film blanks;
  said spine having an anchoring rib disposed between said inner and said outer continuous film blanks;
  means for positioning and securing said anchoring rib inside said spine;
 a booklet comprising
  a plurality of pages, each pair of pages formed from a sheet of flexible material;

said sheet having a central portion for alignment over said spine of said binder and peripheral portions forming separate pages;

said pages having means for holding collectibles;

said means for holding collectibles comprising at least one pocket per page, said pocket adapted for the insertion or removal of collectibles;

said booklet connected to said cover by a series of ultrasonic seals forming a line of attachment, said ultrasonic seals piercing said sheets to fuse said sheets of said booklet from the topmost to the bottom-most sheet;

each of said ultrasonic seals including and dispersing the material of each layer into the successive and adjacent material;

said ultrasonic sealing line of attachment comprising a plurality of sealing points;

said ultrasonic seals piercing said sheets and said inner continuous film blank and extending to operatively engage said anchoring rib to join said sheets to each other and to the spine of said binder.

2. The binder of claim 1 further including means to position and secure said anchoring rib between said inner and said outer continuous film blanks.

3. The binder of claim 1 wherein said pages of said booklet are produced from a plastic film.

4. The binder of claim 3 wherein said plastic film is polypropylene.

5. The binder of claim 1 wherein said cover of said binder is generally opaque and planar and comprises a material selected from the group consisting of vinyl, polyethylene, leather, paper, and cloth.

6. The binder of claim 1 wherein said cover of said binder is produced from a composite material comprising one or more layers of the same or differing materials selected from the group consisting of vinyl, polyethylene, leather, paper, and cloth.

7. The binder of claim 1 wherein said anchoring rib comprises polypropylene.

8. The binder of claim 1 wherein said series of ultrasonic seals is a generally continuous series of seals forming a continuous line of attachment along said central portion.

9. The binder of claim 1 wherein said series of ultrasonic seals is a non-continuous series of seals forming an intermittent line of attachment along said central portion.

10. The binder of claim 1 wherein said means for positioning and securing said anchoring rib inside said spine comprise passages formed in said inner film blank, ultrasonic seals joining said sheets to said anchoring rib coacting with said passages in said inner film blank to position said anchoring rib in said spine.

11. The binder of claim 1 wherein said passages are formed by ultrasonic sealing of said booklet to said anchoring rib through said inner film blank.

12. A binder for storing collectibles in holder pages comprising:

a booklet of holder pages;

a cover enclosing said booklet;

said cover comprising an outer continuous film blank and an inner continuous film blank;

means joining said inner and said outer continuous film blanks together;

said cover including
a front panel;
a rear panel; and
a spine joining said front and rear panels together for allowing relative movement of the front and rear panels between an opened and a closed state of said binder;

an anchoring rib disposed inside said spine between said inner and outer film blanks;

said booklet comprising multiple sheets of flexible material folded around a common center line to form pairs of pages;

said sheets of said booklet being attached to each other along said common center line, and said booklet being attached to said cover at said common center line by a series of ultrasonic seals forming a line of attachment along said common center line, said seals joining said sheets together and joining said sheets to said anchoring rib in said spine.

13. The binder of claim 12 wherein a first foldline interconnects said front panel and said spine;

a second foldline interconnects said rear panel and said spine;

said first and second foldlines formed by parallel lines of attachment delineating said front and rear panels and said spine.

14. The binder of claim 12 wherein said means joining said inner and said outer continuous film blanks together comprises heat sealing.

15. The binder of claim 12 wherein said sheets of said booklet and said anchoring rib are comprised of polypropylene.

16. The binder of claim 12 wherein said cover of said binder is generally opaque and planar and is produced from a material selected from the group consisting of vinyl, polyethylene, leather, paper, and cloth.

17. The binder of claim 12 wherein said cover of said binder is produced from a composite material comprising one or more layers of the same or different materials selected from the group consisting of vinyl, polyethylene, leather, paper, and cloth.

18. The binder of claim 12 wherein said series of ultrasonic seals is a generally continuous series of seals forming a continuous line of attachment along said center line.

19. The binder of claim 12 wherein said series of ultrasonic seals is a non-continuous series of seals forming an intermittent line of attachment along said center line.

20. A binder for storing collectibles in holder pages comprising:

a booklet of holder pages;

a cover enclosing said booklet;

said cover comprising an outer continuous film blank and an inner continuous film blank;

means joining said inner and said outer continuous film blanks together at the peripheral edges thereof;

said cover including
a front panel;
a rear panel; and
a spine joining said front and rear panels together for allowing relative movement of the front and rear panels between an opened and a closed state of said binder;

an anchoring rib disposed in said spine between said inner and outer film blanks;

said booklet comprising multiple sheets of flexible material folded around a common center line to form pairs of pages, each sheet having at least one reverse sheet of substantially similar overall proportions overlying and joined thereto along at least two sides thereof to define at least one pocket adapted for receiving and removably retaining collectibles therein;

said sheets of said booklet being attached to each other along said center line, and said booklet being attached to said cover at said center line by a series of ultrasonic seals forming a line of attachment, said ultrasonic seals piercing said sheets and said inner continuous film blank at said spine and extending to operatively engage said anchoring rib to join said sheets of said booklet together from the topmost to the bottom-most sheet along the line of attachment and to join said booklet to said anchoring rib in said spine of said binder.

21. The binder of claim 20 wherein a first foldline interconnects said front panel and said spine;

a second foldline interconnects said rear panel and said spine;

said first and second foldlines formed by parallel lines of attachment delineating said front and rear panels and said spine.

22. The binder of claim 20 wherein said sheets are fused together and said booklet is joined through said inner film blank to said anchoring rib by agitation of the ultrasonic sealing device along the desired line of attachment.

23. The binder of claim 20 wherein said sheets and said inner film blank are pierced by an ultrasonic sealing device and the fragments produced by the piercing are dispersed by ultrasonic agitation to enable bonding of said booklet to said anchoring rib through said inner film blank.

24. The binder of claim 20 wherein the pierced material of each respective layer of said binder forms fragments which are sufficiently dispersed into the successive and adjacent material at said line of attachment by said ultrasonic sealing action.

25. The binder of claim 20 wherein said front and rear panels of said cover further include an intermediate layer of stiffener between said inner and said outer film blanks.

26. The binder of claim 20 wherein said front and rear panels of said cover further include an intermediate layer of padding between said inner and said outer film blanks.

27. The binder of claim 20 wherein said front and rear panels of said cover further include intermediate layers of stiffener and padding between said inner and said outer film blanks.

28. The binder of claim 20 wherein said series of ultrasonic seals is a generally continuous series of seals forming a continuous line of attachment along said center line.

29. The binder of claim 20 wherein said series of ultrasonic seals is a non-continuous series of seals forming an intermittent line of attachment along said center line.

30. The binder of claim 20 wherein said pages of said booklet and said anchoring rib are each comprised of polypropylene.

31. The binder of claim 20 wherein said cover of said binder is generally opaque and planar and is produced from a material selected from the group consisting of vinyl, polyethylene, leather, paper and cloth.

32. The binder of claim 20 wherein said cover of said binder is produced from a composite material comprising one or more layers of the same or different materials selected from the group consisting of vinyl, polyethylene, leather, paper, and cloth.

33. A binder for storing collectibles in holder pages comprising:

a booklet of holder pages;

a cover enclosing said booklet;

said cover comprising an outer continuous film blank and an inner continuous film blank;

means joining said inner and said outer continuous film blanks together at the peripheral edges thereof;

said cover including a front panel;

a rear panel; and a spine joining said front and rear panels together for allowing relative movement of the front and rear panels between an opened and a closed state of said binder;

an anchoring rib disposed inside said spine between said inner and outer film blanks;

means for positioning and securing said anchoring rib inside said spine;

said booklet comprising multiple sheets of flexible material folded around a common center line to form a pair of pages;

said inner film blank overlying said spine including at least one cutout exposing at least one portion of said concealed anchoring rib, to allow access to said anchoring rib through said exposed portion;

said sheets of said booklet being attached to each other along at least a portion of said center line, and said booklet being attached to said cover along at least a portion of said center line, by a series of ultrasonic seals forming a line of attachment along at least a portion of said center line, said ultrasonic seals joining said sheets together and directly joining said sheets to said anchoring rib in said spine at said exposed portions of said inner film blank.

34. The binder of claim 33 wherein a first foldline interconnects said front panel and said spine;

a second foldline interconnects said rear panel and said spine;

said first and second foldlines formed by parallel lines of attachment delineating said front and rear panels and said spine.

35. The binder of claim 33 wherein said sheets are fused together and said booklet is joined through said cutout portion of said inner film blank to said exposed portion of said anchoring rib by agitation of the ultrasonic sealing along the desired line of attachment.

36. The binder of claim 33 wherein said sheets are fused together and said booklet is joined through at least said cutout portion of said inner film blank to said exposed portion of said anchoring rib by agitation of the ultrasonic sealing along the desired line of attachment.

37. The binder of claim 33 wherein the material of each respective layer of said binder is sufficiently dispersed into the successive and adjacent material at said line of attachment by said ultrasonic sealing action.

38. The binder of claim 33 wherein said front and rear panels of said cover further include an intermediate layer of stiffener between said inner and said outer film blanks.

39. The binder of claim 33 wherein said front and rear panels of said cover further include an intermediate layer of padding between said inner and said outer film blanks.

40. The binder of claim 33 wherein said front and rear panels of said cover further include intermediate layers of stiffener and padding between said inner and said outer film blanks.

41. The binder of claim 33 wherein said series of ultrasonic seals is a generally continuous series of seals forming a continuous line of attachment along said center line.

42. The binder of claim 33 wherein said series of ultrasonic seals is a non-continuous series of seals forming an intermittent line of attachment along said center line.

43. The binder of claim 33 wherein said pages of said booklet and said anchoring rib comprise polypropylene.

44. The binder of claim 33 wherein said cover of said binder is generally opaque and planar and is comprised of a material selected from the group consisting of vinyl, polyethylene, leather, paper and cloth.

45. The binder of claim 33 wherein said cover of said binder is produced from a composite material comprising one or more layers of the same or different materials selected from the group consisting of vinyl, polyethylene, leather, paper, and cloth.

46. The binder of claim 33 wherein said means for positioning and securing said anchoring rib inside said spine comprise passages formed in said inner film blank, ultrasonic seals joining said sheets to said anchoring rib coacting with said passages in said inner film blank to position said anchoring rib in said spine.

47. The binder of claim 46 wherein said passages are formed by ultrasonic sealing of said booklet to said anchoring rib through said inner film blank.

48. A method of manufacturing a binder for storing collectibles having a cover of one material enclosing a booklet of holding pages of a second material, said method comprising the steps of:

forming a cover by superimposing an inner continuous film blank over an outer continuous film blank;

disposing an anchoring rib at a location between said inner and said outer film blanks;

fastening said outer film blank to said inner film blank along the peripheral edges thereof;

fastening said anchoring rib between said inner film blank and said outer film blank;

forming a booklet by assembling multiple sheets of flexible material folded around a common center line to form a pair of pages;

aligning said sheets in relationship above said inner film blank of said cover;

attaching said sheets of said booklet to each other along said common center line, and attaching said booklet to said anchoring rib in said spine of said cover along said center line, by ultrasonically sealing said booklet to said anchoring rib in said spine to form a line of attachment along said center line, said ultrasonic seals extending to operatively engage said anchoring rib to fuse said sheets of said booklet together from the topmost to the bottom-most sheet and to join said booklet to said anchoring rib in said spine of said binder;

including and dispersing the material of each layer into the successive and adjacent material by means of said ultrasonic seals.

49. The method of claim 48 wherein said ultrasonic seals pierce said sheets and said inner continuous film blank to join said sheets to said anchoring rib.

50. The method of claim 48 further including the step of forming passages in the inner continuous film blank to obtain access to said anchoring rib through said inner film blank, said ultrasonic seals extending through said passages to join said booklet directly to said anchoring rib.

51. The method of claim 48 wherein said sheets of said booklet are comprised of polypropylene.

52. The method of claim 48 wherein said cover of said binder is generally opaque and planar and is produced from a material selected from the group consisting of vinyl, polyethylene, leather, paper and cloth.

53. The method of claim 48 wherein said cover of said binder is produced from a composite material comprising one or more layers of the same or differing materials selected from the group consisting of vinyl, polyethylene, leather, paper, and cloth.

54. The method of claim 48 wherein said anchoring rib comprises polypropylene.

55. The method of claim 48 wherein said series of ultrasonic seals is a generally continuous series of seals forming a continuous line of attachment along said center line.

56. The method of claim 48 wherein said series of ultrasonic seals is a non-continuous series of seals forming an intermittent line of attachment along said center line.

57. The method of claim 48 wherein, after the step of fastening said outer to said inner film blank, forming generally parallel foldlines by sealing said inner to said outer film blank along the length of said anchoring rib, said foldlines delineating a front panel of said cover, a rear panel of said cover, and a spine interconnecting said front and rear panels of said cover.

58. The method of claim 48 wherein said anchoring rib is fastened between said inner film blank and said outer film blank by forming passages in said inner film blank and joining said sheets to said anchoring rib through said inner film blank by ultrasonic sealing, said joined pages coacting with said anchoring rib and said passages in said inner film blank to fasten and position said anchoring rib.

59. A method of manufacturing a binder for storing collectibles having a cover of one material enclosing a booklet of holding pages of a second material, said method comprising the steps of:

forming a cover by superimposing an inner continuous film blank over an outer continuous film blank;

disposing an anchoring rib at a location between said inner and said outer film blanks, said anchoring rib defining a spine for said cover;

fastening said outer film blank to said inner film blank along the peripheral edges thereof;

fastening said anchoring rib between said inner film blank and said outer film blanks;

forming a booklet by assembling multiple sheets of flexible material folded around a common center line to form a pair of pages;

aligning said sheets in relationship above said inner film blank of said cover;

obtaining access to said anchoring rib through said inner film blank;

attaching said sheets of said booklet to each other along at least a portion of said common center line, and attaching said booklet to said anchoring rib in said spine of said cover along at least a portion of said center line, by ultrasonically sealing said booklet to said anchoring rib in said spine to form a line of attachment along at least a portion of said center line, said ultrasonic seals piercing said sheets and said inner continuous film blank and extending to operatively engage said anchoring rib through said at least one passage to fuse said sheets of said booklet together from the topmost to the bottom-most sheet and to join said booklet directly to said anchoring rib in said spine of said binder through said at least one passage in said inner film blank;

including and dispersing the material of each layer into the successive and adjacent material by means of said ultrasonic seals.

60. The method of claim 59 wherein the step of obtaining access to said anchoring rib through said inner film blank is accomplished by cutting at least one passage in said inner film blank.

61. The method of claim 59 wherein said series of ultrasonic seals is a generally continuous series of seals forming a continuous line of attachment along said center line.

62. The method of claim 59 wherein said series of ultrasonic seals is a non-continuous series of seals forming a non-continuous line of attachment along said center line.

63. The method of claim 59 wherein said sheets of said booklet are comprised of polypropylene.

64. The method of claim 59 wherein said cover of said binder is generally opaque and planar, and is comprised of a material selected from the group consisting of vinyl, polyethylene, leather, paper and cloth.

65. The method of claim 59 wherein said cover of said binder is produced from a composite material comprising one or more layers of the same or different materials selected from the group consisting of vinyl, polyethylene, leather, paper, and cloth.

66. The method of claim 59 wherein said anchoring rib comprises polypropylene.

67. The method of claim 59 wherein, after the step of fastening said outer to said inner film blank, forming generally parallel foldlines by sealing said inner to said outer film blank along the length of said anchoring rib, said foldlines delineating a front panel of said cover, a rear panel of said cover, and a spine interconnecting said front and rear panels of said cover.

* * * * *